United States Patent
Keen et al.

(10) Patent No.: US 11,487,565 B2
(45) Date of Patent: Nov. 1, 2022

(54) INSTANCES OF JUST-IN-TIME (JIT) COMPILATION OF CODE USING DIFFERENT COMPILATION SETTINGS

(71) Applicant: HEWLETT PACKARD ENTERPRISE DEVELOPMENT LP, Houston, TX (US)

(72) Inventors: Benjamin Keen, Bloomington, MN (US); Peter J. Mendygral, Bloomington, MN (US); Eric Edward Eilertson, Bloomington, MN (US); Kent D. Lee, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/083,769

(22) Filed: Oct. 29, 2020

(65) Prior Publication Data
US 2022/0137994 A1    May 5, 2022

(51) Int. Cl.
| | |
|---|---|
| G06F 9/44 | (2018.01) |
| G06F 9/455 | (2018.01) |
| G06F 11/36 | (2006.01) |
| G06F 8/41 | (2018.01) |

(52) U.S. Cl.
CPC ............ G06F 9/4552 (2013.01); G06F 8/434 (2013.01); G06F 8/4441 (2013.01); G06F 11/3616 (2013.01)

(58) Field of Classification Search
CPC ................................. G06F 9/4552; G06F 8/443
USPC ........................................................ 717/148
See application file for complete search history.

(56) References Cited

U.S. PATENT DOCUMENTS

| | | | | |
|---|---|---|---|---|
| 7,219,329 | B2 * | 5/2007 | Meijer ................... | G06F 8/447 717/106 |
| 7,370,321 | B2 * | 5/2008 | Radigan ................. | G06F 8/433 717/144 |
| 8,370,822 | B2 * | 2/2013 | Sazegari .............. | G06F 8/4443 717/154 |
| 8,522,222 | B2 * | 8/2013 | Tillmann ............... | G06F 8/443 717/148 |
| 8,539,464 | B2 * | 9/2013 | Partridge .............. | G06F 9/4552 709/203 |
| 8,924,944 | B2 * | 12/2014 | Warren ................. | G06F 9/4552 717/140 |
| 9,038,038 | B1 | 5/2015 | Jai et al. | |

(Continued)

OTHER PUBLICATIONS

Hal Finkel et al. "ClangJIT: Enhancing C++ with Just-in-Time Compilation"; 2019 IEEE/ACM International Workshop on Performance, Portability and Productivity in HPC (P3HPC)—2019 IEEE.*

(Continued)

*Primary Examiner* — Francisco J Aponte
(74) *Attorney, Agent, or Firm* — Trop, Pruner & Hu, P.C.

(57) ABSTRACT

In some examples, just-in-time (JIT) control instructions upon execution cause a system to initiate a plurality of instances of JIT compilation of a first code called by a program, where the initiating of the plurality of instances of the JIT compilation of the first code is under control of the JIT control instructions that are outside the program, and the plurality of instances of the JIT compilation of the first code use respective different compilation settings, and are to produce respective JIT compiled instances of the first code.

20 Claims, 3 Drawing Sheets

(56) References Cited

U.S. PATENT DOCUMENTS

| | | | |
|---|---|---|---|
| 9,183,018 B2* | 11/2015 | Jennings | G06F 9/45504 |
| 9,213,563 B2* | 12/2015 | Jennings | G06F 9/45516 |
| 9,244,662 B2* | 1/2016 | Barsness | G06F 9/45516 |
| 9,298,432 B1* | 3/2016 | Abramau | G06F 9/4552 |
| 9,417,857 B2* | 8/2016 | Chafi | G06F 8/41 |
| 9,459,849 B2 | 10/2016 | Bates et al. | |
| 9,501,409 B2* | 11/2016 | Pizlo | G06F 9/45504 |
| 9,524,178 B2* | 12/2016 | Jennings | G06F 9/45504 |
| 9,529,610 B2* | 12/2016 | Jennings | G06F 9/45504 |
| 9,645,912 B2* | 5/2017 | Dubinsky | G06F 11/3644 |
| 9,733,909 B2* | 8/2017 | Abdallah | G06F 8/70 |
| 9,836,290 B2* | 12/2017 | Strehovsky | G06F 8/458 |
| 10,108,442 B1* | 10/2018 | Camarda Silva Folco | G06F 9/4552 |
| 10,289,392 B2* | 5/2019 | Clapauch | G06F 8/433 |
| 10,628,188 B2* | 4/2020 | DiTullio | G06F 9/4552 |
| 10,698,708 B2 | 6/2020 | Kramp et al. | |
| 10,795,989 B2* | 10/2020 | Yavo | G06F 9/45516 |
| 10,824,453 B2* | 11/2020 | Camarda Silva Folco | G06F 8/443 |
| 10,877,757 B2* | 12/2020 | Tirumala | G06F 8/434 |
| 11,106,475 B2* | 8/2021 | Stoodley | G06F 9/44578 |
| 2004/0255268 A1* | 12/2004 | Meijer | G06F 8/447 717/106 |
| 2007/0006178 A1* | 1/2007 | Tan | G06F 8/52 717/136 |
| 2011/0138374 A1 | 6/2011 | Pal | |
| 2013/0067441 A1* | 3/2013 | Lafreniere | G06F 8/41 717/146 |
| 2014/0237458 A1 | 8/2014 | Elias et al. | |
| 2016/0026484 A1* | 1/2016 | Abdallah | G06F 9/30043 717/148 |
| 2016/0321045 A1* | 11/2016 | Radigan | G06F 8/443 |
| 2017/0255780 A1* | 9/2017 | Hughes | G06F 3/0631 |
| 2019/0065223 A1* | 2/2019 | DiTullio | G06F 9/4552 |
| 2019/0079972 A1* | 3/2019 | Lee | G06F 9/4881 |
| 2019/0114159 A1* | 4/2019 | D'Souza | G06F 9/44589 |
| 2020/0241855 A1* | 7/2020 | McCallum | G06F 9/4552 |

OTHER PUBLICATIONS

Delsart, B. et al., JCOD: A Lightweight Modular Compilation Technology for Embedded Java, (Research Paper), EMSOFT 2002, LNCS 2491, pp. 197-212, Oct. 2002.

Lee, H.B., Improving Performance of Mobile Programs via a Compilation Service, (Research Paper), 2004, 157 Pgs.

Wikipedia, Just-in-time compilation last edited Oct. 23, 2020 (10 pages).

* cited by examiner

INSTANCES OF JUST-IN-TIME (JIT) COMPILATION OF CODE USING DIFFERENT COMPILATION SETTINGS

BACKGROUND

A program can include instructions that call functions to perform various tasks. A "function" can refer to any computer code that is executed when invoked. A large program, such as a program for execution in a massively parallel computing environment, can make a large number of function calls.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Just-in-time (JIT) compilation refers to compilation of computer code initiated during execution of a program, i.e., at runtime, rather than prior to the execution of the program. In some examples, JIT compilation is triggered based on a decision made inline in the program. For example, the program includes instructions that can trigger JIT compilations of functions if corresponding conditions are satisfied. Including instructions in a program to make an inline decision regarding whether or not to perform JIT compilation of a function can add to the overhead associated with developing the program, since a programmer would have to add instructions to specific points in the program at which functions are called for controlling whether or not to initiate JIT compilation. If a program includes a large number of function calls, such as a program used in a massively parallel computing environment or another computing environment, then the programming and execution overhead associated with adding instructions to the source code of the program for supporting JIT compilations can be large. Additionally, if the program is a parallel program where the instances of the program executing in parallel are to synchronize with each other frequently, the variation in execution time between the parallel instances caused by one instance deciding to initiate JIT compilation and waiting for the results will slow execution of all the other instances, constituting another source of overhead.

In accordance with some implementations of the present disclosure, a JIT controller that is separate from a program in which functions are called can control whether or not JIT compilation is to be applied to functions being called by the program. Additionally, the JIT controller can trigger multiple instances of JIT compilation of a given function called by the program, where the multiple instances of the JIT compilation of the given function uses respective different compilation settings. The multiple instances of the JIT compilation of the given function produces respective different JIT compiled instances of the given function. The JIT controller can select, at runtime, which of the multiple JIT compiled instances of the given function to use whenever the given function is called by the program. In fact, different JIT compiled instances of the given function can be selected at different call sites in the program, where each call site is a point in the program where the given function is called.

Figure 1:
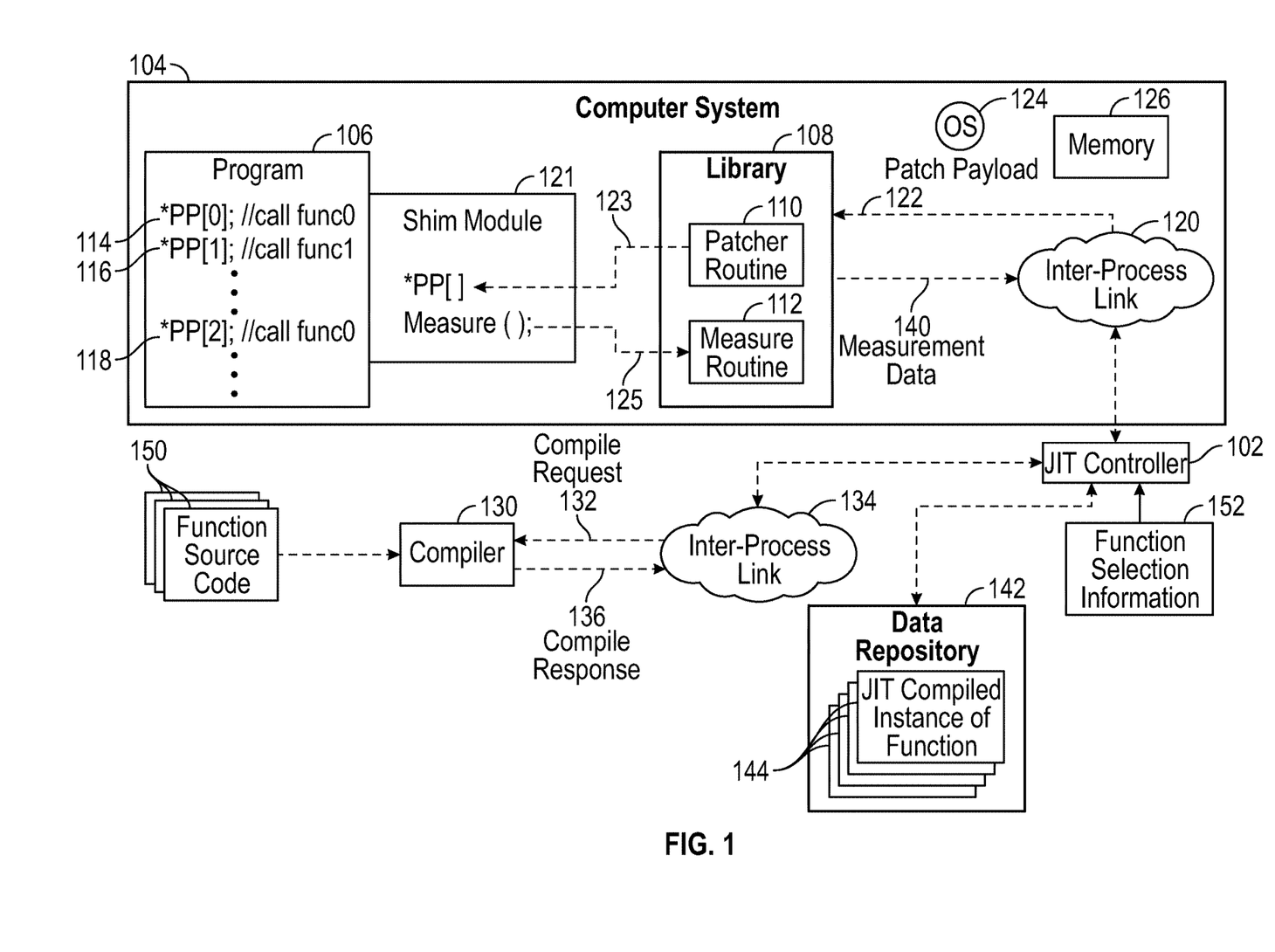
FIG. 1 is a block diagram of an arrangement that includes a just-in-time (JIT) controller to control initiations of multiple instances of JIT compilation of code, according to some examples.

FIG. 1 is a block diagram of an example arrangement that includes a JIT controller 102. The JIT controller 102 can be in the form of machine-readable instructions that are executable in a computer system that can be separate from or the same as a computer system 104 in which a program 106 is executed. The program 106 includes machine-readable instructions that upon execution on a processor cause the processor to perform respective tasks. Machine-readable instructions executable on a processor can refer to the instructions executable on a single processor or the instructions executable on multiple processors.

In some examples, the computer system 104 can include a massively parallel computer system that includes a relatively large number of processors, possibly distributed across multiple computing nodes in a data center or multiple data centers, implemented in a cloud, and so forth. A "computing node" can refer to a computer, such as a server computer or another type of computer. In other examples, the computer system 104 can include a single processor, which may or may not have multiple cores. A "processor" can include a microprocessor, a core of a multi-core microprocessor, a microcontroller, a programmable integrated circuit, a programmable gate array, or another hardware processing circuit.

In examples where the JIT controller 102 runs in the same computer system 104 in which the program 106 executes, the JIT controller 102 is executed on processor(s) that is (are) distinct from the processor(s) on which the program 106 runs, so as not to slow down execution of the program 106 due to JIT operations performed by the JIT controller 102.

Note that in the computer system 104, a single instance of the program 106 can execute, or alternatively, multiple instances of the program 106 can execute. An "instance" of the program 106 can refer to a thread of the program 106 or a process of the program 106.

In some examples, the program 106 is an application program. In other examples, the program 106 can be part of an operating system (OS), firmware, or any other type of machine-readable instructions.

The JIT controller 102 can communicate over an inter-process link 120 with a support library 108 of routines that can be invoked by the JIT controller 102 as part of managing JIT compilation of functions in the program 106 in the accordance with some implementations of the present disclosure. The routines that are part of the support library 108 include a patcher routine 110 and a measure routine 112. The patcher routine 110 and the measure routine 112 when invoked by the JIT controller 102 can be executed as respective instances (threads or processes) of the patcher routine 110 or the measure routine 112.

As used here, the term "library" refers to any collection of pre-written code.

An "inter-process link" can refer to any communication path over which code instances are able to communicate with one another. For example, an inter-process link can include an inter-process communication socket. As another example, an inter-process link can include a shared memory with which code instances are able to communicate with one another. There are other examples of inter-process links.

In the example of FIG. 1, the machine-readable instructions of the program 106 include instructions to call respective functions, such as func0 and func1. Although FIG. 1 depicts the program 106 calling two functions, it is noted that in other examples, the program 106 can include instructions to call a larger number of functions.

As further depicted in FIG. 1, the instructions of the program 106 can call function func0 multiple times. At a first call site 114 in the program 106, the program 106 calls function func0 a first time. At a second call site 116, the program 106 calls function func1. At a third call site 118, the program 106 calls function func0 a second time.

A "call site" refers to a location in the program 106 at which an instruction is provided to call a function.

At a call site (e.g., 114, 116, or 118) in the program 106, the respective instruction does not call the respective function (e.g., func0 or func1) directly. Rather, the instruction at the call site makes an indirect call of the respective function by calling a pointer entry that is part of a patch point array, which is represented as a data structure *PP[ ] in FIG. 1. The patch point array (in the form of the data structure *PP[ ]) includes multiple pointer entries, where each pointer entry can be populated with a pointer to a storage location at which a JIT compiled instance of a function is stored. In some examples, the data structure *PP[ ] is in the form of an array of pointer entries. In other examples, the data structure *PP[ ] can have a different format.

A "pointer" can include an address, a uniform resource locator (URL), or any other information that can be used to determine a storage location in a storage. A "storage" can be implemented using a storage device (or multiple storage devices) and/or a memory device (or multiple memory devices). A storage device can include a disk-based storage device, a solid-state drive, and so forth. A memory device can include a dynamic random access memory (DRAM) device, a static random access memory (SRAM) device, a flash memory device, and so forth.

By indirectly calling a function using a pointer entry, the specific JIT compiled instance of the function that is invoked can be controlled by the JIT controller 102, based on dynamic population (referred to by "adaptive patching") of the pointer entry (in the patch point array) using the patcher routine 110. In this manner, the JIT controller 102 can control, at runtime of the program 106, which JIT compiled instance (which can be selected from multiple JIT compiled instances of the function in some cases) of a called function to invoke.

In some examples, the support library 108 is linked into a modified program (e.g., 106) (which has been modified to add instructions to indirectly call functions by calling a pointer entry. After modifying the program to include function pointer entries, and linking in the support library 108, the resulting combination of the program and the support library 108 can adaptively link new items (i.e., JIT compiled instances of functions) against the pointer entries in PP[ ].

In accordance with some implementations of the present disclosure, a shim module 121 is associated with the program 106. A "shim module" refers to code that intercepts calls (in this case calls of functions in the program 106) and changes arguments that are passed with the call, in this case a pointer for a JIT compiled instance of a called function. The shim module 121 refers to the patch point array (data structure *PP[ ]). The patcher routine 110 when invoked by the JIT controller 102 can populate (also referred to as "patch") (at 123) a pointer entry (or multiple pointer entries) of the patch point array with a respective pointer (or multiple pointers).

The JIT controller 102 provides a patch payload 122 over the inter-process link 120, to be received by the patcher routine 110. The patch payload 122 contains values of pointer(s) to place into respective pointer entry (or pointer entries) of the patch point array. The JIT controller 102 can interact with an operating system (OS) 124 of the computer system 104 to write the content of the patch payload 122 to a memory 126 of the computer system 104. The content of the patch payload 122 written to the memory 126 can be read by the patcher routine 110, and written to a respective pointer entry (or pointer entries) of the patch point array. The writing of a pointer (or multiple pointers) to a corresponding pointer entry (or multiple pointer entries) of the patch point array can be accomplished using atomic memory read and write operations, in examples where the patch point array is stored in a memory, such as the memory 126. Atomic memory read and write operations prevents corruption of a patch point entry of the patch point array during the reads and writes, such that the pointer in the patch point entry cannot be maliciously or otherwise modified to point to an invalid executable code; i.e., the atomicity property ensures that the pointer in the patch point entry points to a valid JIT compiled instance of a function.

At the call site 114 of the program 106, to indirectly call the function func0, the program 106 calls a pointer entry *PP[0], which is part of *PP[ ]. The actual pointer in the pointer entry *PP[0] is patched by the patcher routine 110, responsive to the patch payload 122 provided by the JIT controller 102.

Note that the pointer written to the pointer entry *PP[0] by the patcher routine 110 in response to the patch payload 122 from the JIT controller 102 for the call of func0 at the call site 114 may be different from a pointer written to the pointer entry *PP[2] by the patcher routine 110 in response to another patch payload 122 from the JIT controller 102 for the call of func0 at the other call site 118. Pointers populated into the pointer entries *PP[0] and *PP[2] by the patcher routine 110 (responsive to patch payloads 122 from the JIT controller 102) point to different versions of the function func0. In this manner, multiple different JIT compiled instances of the function fund0 (compiled using different compilation settings) can be present at the same time.

More generally, at multiple call sites of a given function in the program 106, a corresponding pointer entry can be included at each of the multiple call sites. In some cases, the same pointer entry (e.g., PP[X]) can be provided at each of the multiple call sites, in which case each call of the given function at all call sites of the program 106 goes to the patched function (JIT compiled instance of the given function) at the pointer written into PP[X].

In other cases, every distinct call site for the given function can have a different pointer entry (e.g., PP[$X_j$], where j identifies a respective call site), so that as many different pointers as call sites can be used to allow for individual selection of patched functions to use at each call site. Initially, all the PP[$X_j$] values (j=1, 2, . . . ) may be assigned the same pointer value, to point to one JIT compiled instance of the given function. Later, the JIT controller 102 can change the PP[$X_j$] values to point to different JIT compiled instances of the given function, depending on at which call site of the program the given function is called.

In some examples, when the program 106 calls a pointer entry associated with a given function (e.g., func0 or func1), the shim module 121 intercepts the call, and reads a pointer in the pointer entry (which was patched by the patcher routine 110 under control of the JIT controller 102). The shim module 121 then goes to a respective storage location referred to by the pointer, and invokes execution of a given JIT compiled instance at respective the storage location for the given function. In other examples, an intervening module such as the shim module 121 does not have to be present, and hardware can jump to the JIT compiled instance of the function pointed to by the pointer in the pointer entry, which can start executing.

In some examples, JIT compiled instances of functions 144 may be stored in a data repository 142 (e.g., a database). The data repository 142 can be stored in a storage medium (not shown) (implemented using storage device(s) and/or memory device(s). The JIT compiled instances of functions 144 are stored at respective storage locations that are referred to by pointers that populate the pointer entries of the patch pointer array (*PP[ ]).

Once the given JIT compiled instance at the respective storage location is executed, the shim module 121 also invokes (at 125) the measure routine 112 in the support library 108, to cause the measure routine 112 to measure a performance of the given JIT compiled instance of the given function at runtime of the program 106. Measurement data 140 is provided by the measure routine 112 back to the JIT controller 102 over the inter-process link 120. For example, the measurement data 140 can be written to the memory 126, which is then read by the JIT controller 102. The measurement data 140 can be associated with the given JIT compiled instance of the function, such as in the data repository 142.

In further examples, instead of using an external inspection technique such as with use of the measure routine 112, a patched function (i.e., the function when the system jumps to the pointer in PP[i], i=1 to N, where N represents the number of pointer entries in PP[ ]) can have measurement instructions added to the patched function, under the control of the JIT controller 102. The added measurement instructions can cause the patched function to populate or update the measurements whenever the patched function is called. As a result, measurements of performance of the patched function are performed using internal measurement instructions that are part of the JIT compiled instance of the function.

Another instance of the patched function may not have the measurement instructions added to the patched function, if the patched function is not called. This internal technique of measurement from within the patched function allows the overhead of performing measurements to be applied only at the time and place where the patched function is actually called. In addition, by using the internal measurement technique, measurements are controlled from within the patched function, such that an external measurement technique does not have to be used in which profiling may be used where a measurement profile is built up by stopping execution of a program to determine how much time a program spends with a function, which may not be efficient when measurements are desired for just a particular patched function.

For each call of the given function by the program 106, the JIT controller 102 can select a JIT compiled instance of the given function from among multiple JIT compiled instances of the given function (if available), based on which provides better performance according to the measurement data associated with the respective JIT compiled instances of the given function.

Examples of measurements that can be indicated in the measurement data 140 include how many times a function is called, how long the function took to execute, a size of a JIT compiled instance of a function, statistics on values of variables of a function in calls of the function, and so forth. The statistics on values of variables of a function, such as f(x, y), where x and y are variables, can provide an indication of which constant values are assigned to a variable more often, so that the variable can be set to the more frequently used constant values (or ranges of constant values) when requesting a JIT compilation of the function f(x, y).

Although FIG. 1 shows an example in which the shim module 121 is used to allow patching of pointers into pointer entries of the patch point array, and to perform measurements of execution of JIT compiled instances of functions, it is noted that in other examples, other mechanisms can be used to allow the JIT controller 102 to patch pointers into pointer entries of the patch point array, and to perform measurements of execution of JIT compiled instances of functions.

Note that initially, when the program 106 starts running, there may be no JIT compiled instances of a function in the data repository 142. In other examples, the pointer entries of the patch pointer array (PP[ ]) can be initialized at startup with default pointers that point to JIT compiled instances of respective functions compiled using a default compilation setting. Such JIT compiled instances of respective functions compiled using the default compilation setting can be used initially for calls of functions in the program 106 until the JIT controller 102 starts triggering more JIT compilations of functions as calls of the functions are made in the program 106. In another example, the pointer entries of the patch pointer array (PP[ ]) can be initialized at startup with pointers to stub routines (that do not perform any tasks), to cause the call of a function to pause until the JIT controller 102 can patch in a pointer to an actual JIT compiled instance of the function.

In examples where there are no JIT compiled instances in the data repository 142 for a given function that is called by the program 106, the JIT controller 102 can request a JIT compilation of the given function, using a default compilation setting for example. A default compilation setting can refer to any compilation setting predefined to be used in the absence of other criteria being satisfied that would indicate use of a specific compilation setting.

In other examples, the JIT controller 102 can request a JIT compilation of the given function using a compilation setting according to whether a criterion (or multiple criteria) is (are) satisfied. For example, the compilation setting used can be based on a location where the given function is to execute. The location where the given function is to execute can refer to a specific processor of multiple processors, a specific computing node of multiple computing nodes, a geographic location of multiple geographic locations, and so forth. In an arrangement of processors (e.g., a mesh of processors), some of the processors may have faster access of a memory than other processors, which may impact which compilation setting to use. If the computer system 104 has multiple computing nodes, some of the computing nodes may have a higher speed or higher bandwidth connection to a network than other computing nodes, which may impact which compilation setting to use. If the computer system 104 has computing nodes distributed across multiple geographic locations, the geographic location where the given function is to execute may impact which compilation setting to use.

The foregoing provides examples of selecting a compilation setting (by the JIT controller 102) from among multiple compilation settings based on a location-related criterion. In other examples, the JIT controller can select a compilation setting, from among multiple compilation settings, based on a processor status-related criterion, which is a criterion based on a status of the processor. The status of the processor may relate to how full queues are in the processor. Another status of the processor may relate to how busy the processor is (e.g., how many cores of the processor are actively being used, and/or how many cores of the processor are idle).

As another example, the JIT controller 102 can select a compilation setting based on a physical layout of physical resources of the computer system 104. For example, the physical resources can include queues to be accessed during execution of a particular function. The queues may be in a memory attached to specific processors or part of specific computing nodes of the computer system 104.

In other examples, other criteria can be used by the JIT controller 102 in selecting a compilation setting, from among multiple compilation settings, when requesting a compiler 130 to perform JIT compilation of a function.

In further examples, the data repository 142 may be populated with JIT compiled instances of functions created as part of another execution instance of the program 106. Note that the program 106 may be invoked at different times, which causes multiple instances of the program 106. The JIT compiled instances of functions contained in the data repository 142 can be shared by the multiple instances of the program 106.

A "compilation setting" can refer to which compiler option is requested for compiling a function. Note that the compiler 130 has multiple different compiler options. In some cases, a compilation setting can include multiple compiler options.

An example of a compiler option includes an option to perform unrolling of a loop in the function code. Unrolling a loop refers to replacing the loop with a sequence of instructions that will perform the task of the loop a specified number of times, such that the program code does not have to check the loop condition. Not having to check the loop condition can reduce the processing overhead, since a processor executing the program code would not have to execute instructions and perform memory accesses to check the loop condition for each iteration of the loop. However, the number of distinct instructions the processor has to load from memory for execution is increased, which takes up more memory space and bandwidth internally to the processor.

Other compiler options include whether to use specific types of instructions such as vector instructions that operate on multiple values at once, in the compiled version of the function. Such instructions can speed up execution when a larger number of items are to be processed, but this situation is generally not knowable at compile time but can be known at runtime. Additionally, such instructions are not available on every otherwise compatible version of a processor, or not on every parallel core in a processor. Another example of a compiler option is whether to optimize for size, which attempts to provide an implementation of the function using instructions that take the smallest space in memory, which can increase overall execution speed when the program is constrained by memory bandwidth.

For each of the functions (e.g., func0 and func1) called by the program 106, the JIT controller 102 can request a JIT compilation (or multiple instances of JIT compilation) of the function.

Source code 150 for the functions can be stored in a storage medium (not shown). The compiler 130 is able to perform a JIT compilation of the source code 150 of a function, in response to a compile request 132 sent by the JIT controller 102 to the compiler 130 over an inter-process link 134. The compiler 130 can be executed in the same computer system or a different computer system as the JIT controller 102. Although FIG. 1 shows one compiler 130, it is noted that there can be multiple compilers 130 in other examples. The multiple compilers 130 can be executed in parallel on respective different processors, to perform multiple instances of JIT compilation of a given function using different compilation settings, for example.

The compile request 132 can specify a compilation setting to be used by the compiler 130 when JIT compiling a source code 150 of a function.

Once the compiler 130 compiles the source code 150 of a function in response to the compile request 132 from the JIT controller 102, the compiler 130 sends a compile response 136 over the inter-process link 134 to the JIT controller 102. The compile response 136 can include a JIT compiled instance of the function compiled by the compiler 130.

The JIT controller 102 can send, to the compiler 130, multiple compile requests 132 to initiate multiple instances of JIT compilation of a function using respective different compilation settings. In response to such compile requests 132, the compiler 130 can compile the source code 150 of the function using the different compilation settings, to produce respective different JIT compiled instances of the function.

JIT compiled instances of functions 144 produced by the compiler 130 and sent by the compiler 130 to the JIT controller 102 can be added by the JIT controller 102 to the data repository 142.

In some examples, JIT compilation may not be performed on all functions called by the program 106. For example, function selection information 152 can identify just a subset of the functions for which JIT compilation is to be performed. The function selection information 152 can be based on user input, or alternatively, the function selection information 152 can be included in a profile.

In accordance with some implementations of the present disclosure, the decision to initiate JIT compilation of a function called by the program 106 is performed by the JIT controller 102 out of line with respect to the program 106 (i.e., JIT compilation is not initiated by instructions in the program 106). As a result, the cost in time and processing resources to make a function call from the program 106 can be reduced, since no instructions of the program 106 have to be executed to make a decision regarding JIT compilation. Reducing the amount of time involved and processing resources consumed can improve the efficiency of JIT compilations of functions, and can also reduce variability across multiple computing nodes of a large computing environment.

The infrastructure overhead (including resources for the JIT controller 102) for performing adaptive patching is amortized over multiple instances of the program 106 that may execute in a computing node. In other words, within a computing node, there does not have to be one JIT controller 102 per instance of the program 106. The tasks of the JIT controller 102, the tasks of the patcher routine 110, and the tasks of the measure routine 112 can be performed on processors that are separate from processors on which the program 106 executes.

In some examples, system resources including processors separate from the processors used to execute the program 106 can be used to find an optimal JIT compiled instance of a function, such as by using an optimization algorithm. The optimization algorithm can determine which criteria (e.g., discussed above) are satisfied for a given execution of a function, and can select the optimal JIT compiled instance of the function (if one was previously created) or an optimal compilations setting. In this manner, the JIT compilation operations do not slow down the work of the program 106.

The adaptive linking mechanism by which the JIT controller 102 can link to a program supports multi-threading. Note that there can be multiple instances (threads or processes) of the program 106 executing in the computer system 104. Since the number of instances of the program 106 can be dynamic (i.e., can change over time), it may be challenging to perform patching of the patch point array for each instance of the program 106. In accordance with some implementations of the present disclosure, in examples where there are multiple threads of the program 106, the program 106 can use a Portable Operating System Interface (POSIX) threads application programming interface (API). The POSIX threads API allows the JIT controller 102 to know when a new instance of the program 106 is created. The program 106 has thread local variables (pointer entries of the patch point array) that exist in the context of a call for a particular thread of the program 106. Different threads of the program 106 use different thread local variables.

As noted above, the program 106 can call a function using a pointer entry of the patch point array. In some examples, no branch of the program 106 is performed for the call, i.e., the program 106 is not stopped to make a determination of whether it is safe to follow the pointer in the pointer entry to execute the JIT compiled instance of the function. The program 106 also does not block as measurements are taken by the measure routine 112 or as the patcher routine 110 updates a pointer entry in the patch pointer array.

In some examples, patch updates (patching of pointer entries) and measurement collections can occur in a variety of ways. For example, blind reads and writes can be performed, with no protection of the patch point array and without blocking (i.e., a lock is not acquired to update the patch point array). Also, reads and writes of the measurement data 140 in the memory 126 acquired by the measure routine 112 can be performed without blocking.

In other examples, a handler can be triggered by an auxiliary routine (the patcher routine 110 or the measure routine 112), where the handler can perform any or some combination of the following tasks: receive pointers in pointer entries of the patch pointer array in the memory 126, write measurement data 140 to the memory 126, relocate variables of the patcher routine 110 or the measure routine 112 to different memory locations, and so forth.

In some examples, a JIT compiled instance of a function can be placed in executable mapped memory (e.g., a memory used to store executable code), keeping the work out of line of the program 106.

OS operations performed by the JIT controller 102 are amortized across multiple instances of the program 106 in a computing node. The JIT controller 102 can interact with the OS 124 to request allocation of a memory for executing a JIT compiled instance of a function. The OS operations for such memory allocation is performed once, since the JIT compiled instance can be used at the computing node by any number of instances of the program 106.

In some examples, more optimal custom implementations of a function can be accomplished by setting an input variable used by a function to a constant value. For example, assume a function has a form f(x, y), where x is an input or output variable, and y is an input variable that is set when the function is called. In some examples, the JIT controller 102 can request that the compiler 130 compile the function f(x, K), where K is a constant value (or a range of constant values) set for y. A JIT compiled instance of the function f( ) can run faster if y is set equal to K (or the range of constant values). This can be advantageous in examples where the program makes multiple calls of f(x, y) where y is set equal to K (or the range of constant values). However, if the program makes multiple calls of f(x, y) and y is different on each call, then performing a JIT compilation of the function f( ) with y set equal to K (or the range of constant values) may not be beneficial. The JIT controller 102 can select the value of K (or the range of constant values) based on past executions of the function f( ), for example. Note that more generally, more than one variable of a function can be set to respective constant values or respective ranges of constant values.

More generally, a JIT compiled instance of the function f( ) can be generated where an input variable satisfies a logical predicate. For example, the "logical predicate" being satisfied can be where y is equal K or a range of constant values. As another example, in the context of vector instructions discussed further above, compiling a function with a compilation setting to use vector instructions can be beneficial if the function is to process an array of a large number of elements (e.g., greater than a threshold number). On the other, if the function is to process an array with a small number of elements (less than or equal to the threshold number), then use of vector instructions may hurt performance. In this example, the logical predicate would be "does the argument of the function indicate that the number of elements to process exceeds a specified threshold?" If this logical predicate is satisfied, then JIT compilation using a compilation setting that causes vector instructions to be produced can be performed.

Figure 2:
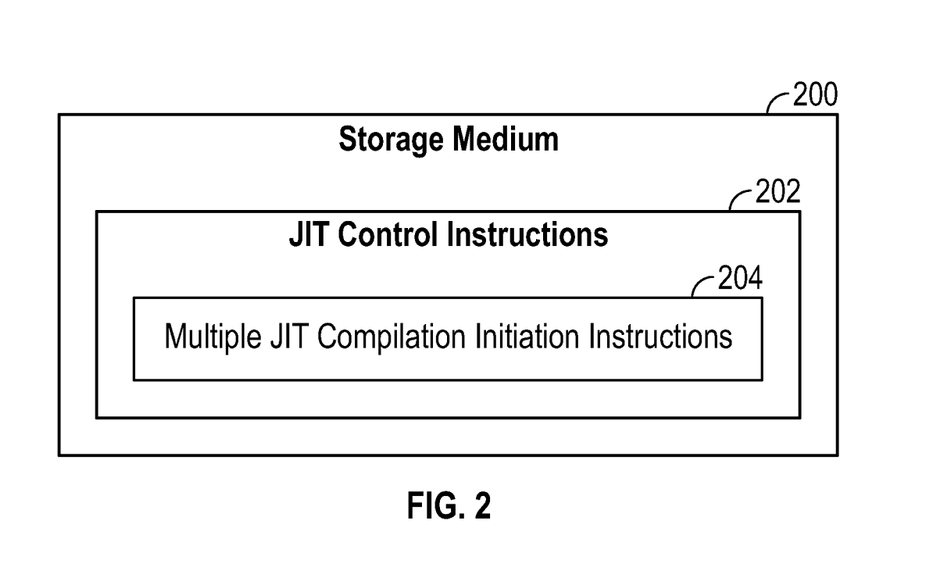
FIG. 2 is a block diagram of a storage medium storing machine-readable instructions according to some examples.

FIG. 2 is a block diagram of a non-transitory machine-readable or computer-readable storage medium 200 that stores machine-readable instructions that upon execution cause a system (e.g., a computer system in which the JIT controller 102 is executed) to perform various tasks.

The storage medium 200 stores JIT control instructions 202 (e.g., of the JIT controller of FIG. 1). The JIT control instructions 202 include multiple JIT compilation initiation instructions 204 to initiate a plurality of instances of JIT compilation of a first code (e.g., function code) called by a program. The initiating of the plurality of instances of the JIT compilation of the first code is under control of the JIT control instructions 202 that are outside the program. The plurality of instances of the JIT compilation of the first code use respective different compilation settings, and cause production of respective JIT compiled instances of the first code.

In some examples, the JIT control instructions 202 upon execution cause the system to receive measurements relating to executions of the JIT compiled instances of the first code, and select, in response to a call of the first code by the program, a compiled instance of the JIT compiled instances of the first code based on the measurements.

In some examples, the program includes a first instruction to indirectly call the first code by calling a pointer entry associated with the first code, and where the JIT control instructions upon execution cause the system to add, at runtime of the program under control of the JIT control instructions, a first pointer for the first code to the pointer entry, where the first pointer refers to a storage location at which a first JIT compiled instance of the first code is stored.

In some examples, the program includes a second instruction, different from the first instruction, to indirectly call the first code by calling the pointer entry associated with the first code, and where the JIT control instructions upon execution cause the system to add, at the runtime of the program under control of the JIT control instructions, a second pointer for the first code to the pointer entry, where the second pointer refers to a storage location at which a second JIT compiled instance of the first code is stored, the second JIT compiled instance of the first code being different from the first JIT compiled instance of the first code.

In some examples, an execution of the program is not blocked for measurement of an execution of a JIT compiled instance of the first code or for patching a pointer for a JIT compiled instance of the first code responsive to a call of the first code by the program.

In some examples, the JIT control instructions upon execution cause the system to select, for a call of the first code in the program, a JIT compiled instance of the first code from the JIT compiled instances of the first code based on which location of a plurality of locations (e.g., processors, computing nodes, geographic locations, etc.) the first code is to execute at in response to the call.

In some examples, the JIT control instructions upon execution cause the system to select, for a call of the first code in the program, a JIT compiled instance of the first code from the JIT compiled instances of the first code based on a status of processor that is to execute the first code in response to the call.

In some examples, the JIT control instructions upon execution cause the system to select, for a call of the first code in the program, a JIT compiled instance of the first code from the JIT compiled instances of the first code based on a physical layout of physical resources of a computer system in which the program is executed.

Figure 3:
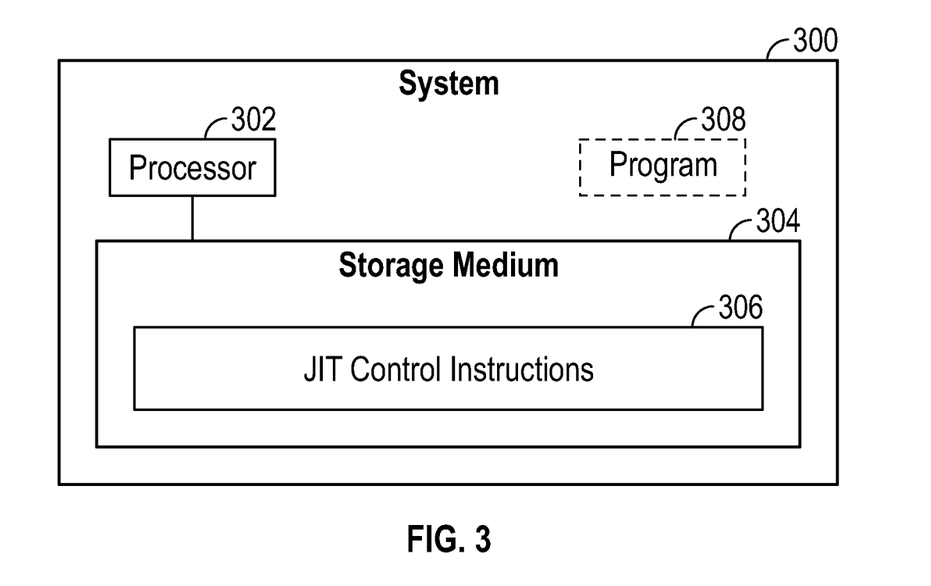
FIG. 3 is a block diagram of a system according to some examples.

FIG. 3 is a block diagram of a system 300 that includes a processor 302 (or multiple processors). The system further includes a storage medium 304 storing JIT control instructions 306 separate from a program 308 that is to call a function a plurality of times. The JIT control instructions 306 are executable on the processor 302 to, for a first call of the function by the program, cause execution of a first JIT compiled instance of the function compiled by a compiler using a first compilation setting. The JIT control instructions 306 are executable on the processor 302 to, for a second call of the function by the program, cause execution of a second JIT compiled instance of the function compiled by the compiler using a second compilation setting that is different from the first compilation setting.

Figure 4:
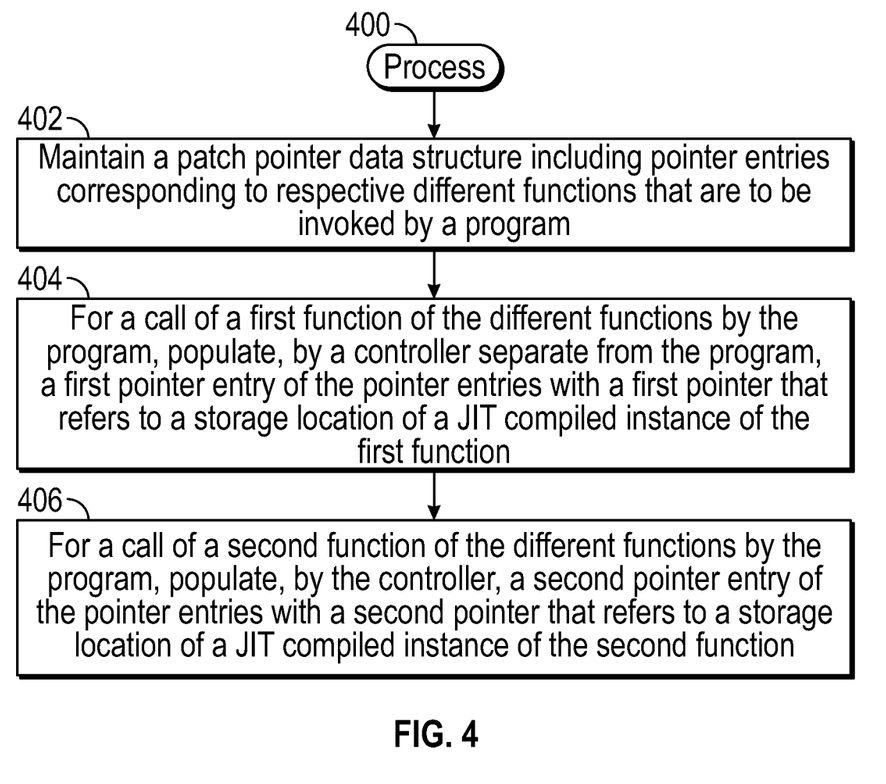
FIG. 4 is a flow diagram of a process according to some examples.

FIG. 4 is a flow diagram of a process 400 according to some examples. The process 400 can be performed by the JIT controller 102, for example. The process 400 includes maintaining (at 402) a patch pointer data structure (e.g., *PP[ ] shown in FIG. 1) including a plurality of pointer entries corresponding to respective different functions that are to be invoked by a program.

The process 400 includes, for a call of a first function of the different functions by the program, populating (at 404), by a controller separate from the program, a first pointer entry of the pointer entries with a first pointer that refers to a storage location of a JIT compiled instance of the first function. This can be performed by the controller sending a patch payload (e.g., 122 in FIG. 1) to the patcher routine 110, for example.

The process 400 includes, for a call of a second function of the different functions by the program, populating (at 406), by the controller, a second pointer entry of the pointer entries with a second pointer that refers to a storage location of a JIT compiled instance of the second function. In each of task 404 and 406, the controller can select a JIT compiled instance of a respective function (the first or second function) from among multiple JIT compiled instances of the respective function, based on measurements as discussed further above.

A storage medium (e.g., 200 in FIG. 2 or 304 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising just-in-time (JIT) control instructions that upon execution cause a system to:

initiate a plurality of instances of JIT compilation of a first code called by a program, wherein the initiating of the plurality of instances of the JIT compilation of the first code is under control of the JIT control instructions that are outside the program, the plurality of instances of the JIT compilation of the first code using respective different compilation settings, and are to produce respective plural JIT compiled instances of the first code;

store, in a data repository, the plural JIT compiled instances of the first code produced using the respective different compilation settings; and     in response to a call of the first code in the program, select a JIT compiled instance of the first code from among the plural JIT compiled instances of the first code stored in the data repository, the selecting being based on a criterion.

2. The non-transitory machine-readable storage medium of claim 1, wherein the JIT control instructions upon execution cause the system to:
  receive measurements relating to executions of the plural JIT compiled instances of the first code; and
  select, in response to the call of the first code in the program, the JIT compiled instance of the first code from among the plural JIT compiled instances of the first code based on the measurements.

3. The non-transitory machine-readable storage medium of claim 2, wherein the measurements are acquired at runtime of the program, and are acquired by measurement instructions invoked responsive to execution of a JIT compiled instance of the first code in response to the first code being called by the program.

4. The non-transitory machine-readable storage medium of claim 1, wherein the program comprises a first instruction to indirectly call the first code by calling a first pointer entry in a data structure, and wherein the JIT control instructions upon execution cause the system to:
  add, at runtime of the program under control of the JIT control instructions, a first pointer for the first code to the first pointer entry, wherein the first pointer refers to a location at which a first JIT compiled instance of the first code is stored.

5. The non-transitory machine-readable storage medium of claim 2, wherein the selecting based on the measurements comprises selecting the JIT compiled instance of the first code from among the plural JIT compiled instances of the first code based on a determination of which of the plural JIT compiled instances of the first code provides better performance according to the measurements.

6. The non-transitory machine-readable storage medium of claim 4, wherein the program comprises a second instruction, different from the first instruction, to indirectly call the first code by calling a second pointer entry in the data structure, and wherein the JIT control instructions upon execution cause the system to:
  add, at the runtime of the program under control of the JIT control instructions, a second pointer for the first code to the second pointer entry, wherein the second pointer refers to a location at which a second JIT compiled instance of the first code is stored, the second JIT compiled instance of the first code being different from the first JIT compiled instance of the first code.

7. The non-transitory machine-readable storage medium of claim 5, wherein the measurements indicate how long each JIT compiled instance of the plural JIT compiled instances took to execute, or a size of each JIT compiled instance of the plural JIT compiled instances.

8. The non-transitory machine-readable storage medium of claim 7, wherein the measurements further indicate how many times each JIT compiled instance of the plural JIT compiled instances was called.

9. The non-transitory machine-readable storage medium of claim 1, wherein the program is without any instruction related to the JIT compilation of the first code.

10. The non-transitory machine-readable storage medium of claim 1, wherein an execution of the program is not blocked for measurement of an execution of a JIT compiled instance of the first code or for patching a pointer for a JIT compiled instance of the first code responsive to the call of the first code in the program.

11. The non-transitory machine-readable storage medium of claim 1, wherein the plurality of instances of the JIT compilation of the first code are useable by multiple instances of the program.

12. The non-transitory machine-readable storage medium of claim 1, wherein the first code has an input variable, and wherein initiating the plurality of instances of the JIT compilation of the first code comprises:
  initiating multiple instances of JIT compilation of the first code where the input variable satisfies a logical predicate.

13. The non-transitory machine-readable storage medium of claim 1, wherein the JIT control instructions upon execution cause the system to:
  select, for the call of the first code in the program, the JIT compiled instance of the first code from among the plural JIT compiled instances of the first code based on which location of a plurality of locations the first code is to execute at in response to the call.

14. The non-transitory machine-readable storage medium of claim 1, wherein the JIT control instructions upon execution cause the system to:
  select, for the call of the first code in the program, the JIT compiled instance of the first code from among the plural JIT compiled instances of the first code based on a status of a processor that is to execute the first code in response to the call.

15. The non-transitory machine-readable storage medium of claim 1, wherein the JIT control instructions upon execution cause the system to:
  select, for the call of the first code in the program, the JIT compiled instance of the first code from among the plural JIT compiled instances of the first code based on a physical layout of physical resources of a computer system in which the program is executed.

16. A system comprising:
a processor; and
a non-transitory storage medium storing just-in-time (JIT) control instructions separate from a program that is to call a function a plurality of times, the JIT control instructions executable on the processor to:
  for a first call of the function by the program:
    select a first JIT compiled instance of the function compiled by a compiler using a first compilation setting, and cause execution of the first JIT compiled instance of the function that is stored in a data repository storing a plurality of JIT compiled instances of the function; and
  for a second call of the function by the program:
    select a second JIT compiled instance of the function compiled by the compiler using a second compilation setting that is different from the first compilation setting, and cause execution of the second JIT compiled instance of the function that is stored in the data repository.

17. The system of claim 16, wherein the JIT control instructions are executable on the processor to:
  for the first call of the function, patch a first pointer to a first pointer entry of a patch pointer data structure, the first pointer referring to a storage location of the first JIT compiled instance of the function; and
  for the second call of the function, patch a second pointer to the first pointer entry of the patch pointer data structure, the second pointer referring to a storage location of the second JIT compiled instance of the function.

18. The system of claim 16, wherein the JIT control instructions are executable on the processor to:
- receive measurement data associated with measurements of performance of the first JIT compiled instance of the function and the second JIT compiled instance of the function;
- select the first JIT compiled instance of the function for the first call of the function based on the measurement data, wherein the selecting based on the measurement data comprises selecting the first JIT compiled instance of the function from among the plurality of JIT compiled instances of the function based on a determination of which of the plurality of JIT compiled instances of the function provides better performance according to the measurements; and
- select the second JIT compiled instance of the function for the second call of the function based on the measurement data.

19. A method comprising:
- initiating, by just-in-time (JIT) control instructions executed on a hardware processor of a system, a plurality of instances of JIT compilation of a first code called by a program, wherein the initiating of the plurality of instances of the JIT compilation of the first code is under control of the JIT control instructions that are outside the program, the plurality of instances of the JIT compilation of the first code using respective different compilation settings, and the plurality of instances of the JIT compilation of the first code producing respective plural JIT compiled instances of the first code;
- storing, in a data repository, the plural JIT compiled instances of the first code produced using the respective different compilation settings; and
- in response to a call of the first code in the program, selecting, by the JIT control instructions, a JIT compiled instance of the first code from among the plural JIT compiled instances of the first code stored in the data repository, the selecting being based on a criterion.

20. The method of claim 19, further comprising:
- receiving, by the JIT control instructions, measurements relating to executions of the plural JIT compiled instances of the first code,
- wherein the selecting of the JIT compiled instance of the first code from among the plural JIT compiled instances of the first code is based on a determination of which of the plural JIT compiled instances of the first code provides better performance according to the measurements.

* * * * *